UNITED STATES PATENT OFFICE.

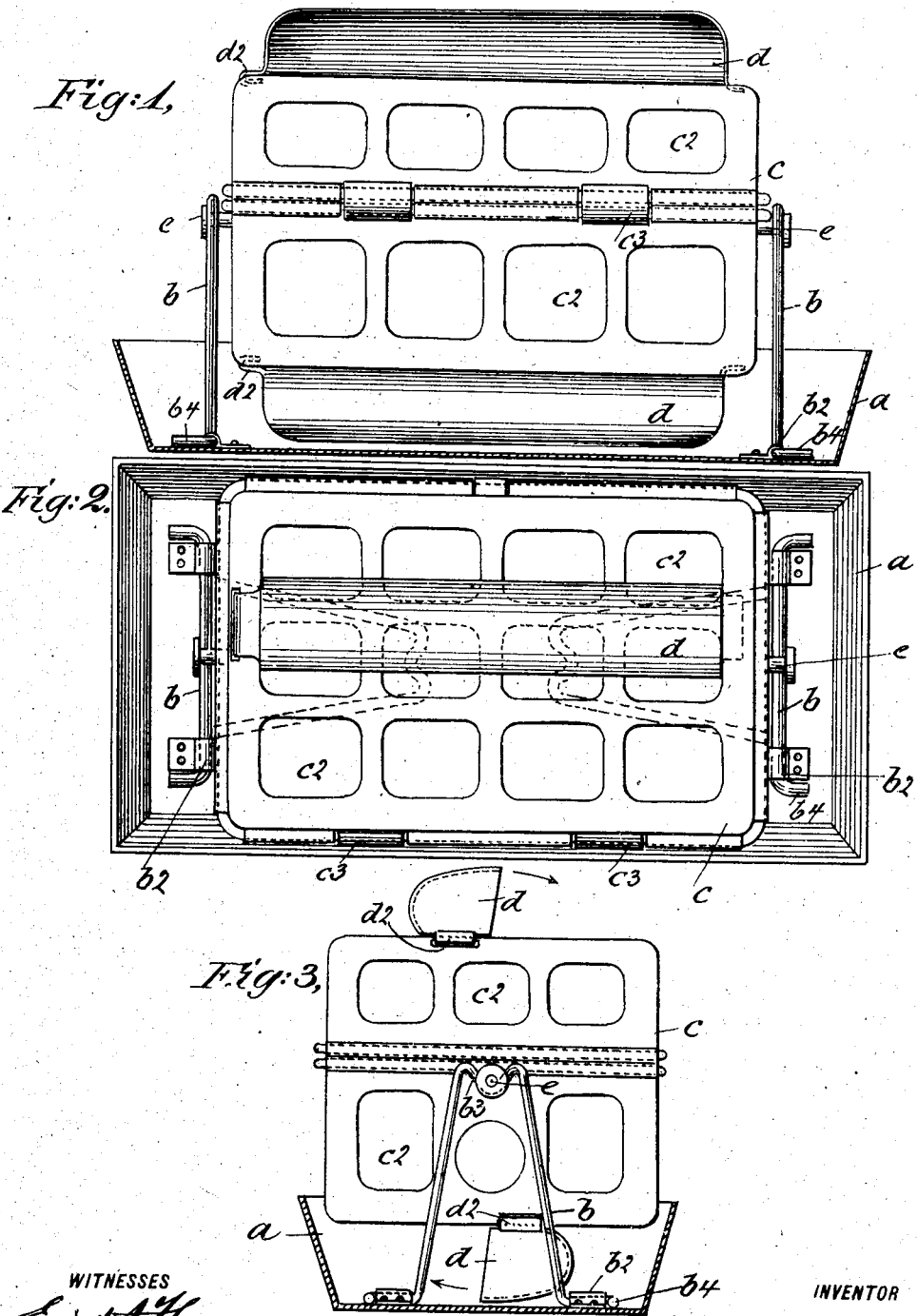

CHARLES MANNHEIM, OF NEW YORK, N. Y.

MEAT-ROASTING DEVICE.

No. 833,970. Specification of Letters Patent. Patented Oct. 23, 1906.

Application filed May 4, 1906. Serial No. 315,136.

*To all whom it may concern:*

Be it known that I, CHARLES MANNHEIM, a citizen of the United States, residing at New York, in the county of New York and State of New York, have invented certain new and useful Improvements in Meat-Roasting Devices, of which the following is a specification, such as will enable those skilled in the art to which it appertains to make and use the same.

This invention relates to meat-roasting devices; and the object thereof is to provide an improved device of this class which is designed to be placed in a stove or range and by means of which a piece of meat—such as a roast, a chicken, a turkey, or any other article of this class which it is desired to roast—may be more conveniently roasted or cooked than with devices of this class as usually constructed and which will also serve the purpose of an automatic baster during the process of cooking.

The invention is fully disclosed in the following specification, of which the accompanying drawings forms a part, in which the separate parts of my improvement are designated by suitable reference characters in each of the views, and in which—

Figure 1 is a side view of my improved meat-roasting device, part of the construction being in section; Fig. 2, a plan view thereof; and Fig. 3, an end view with part of the construction in section.

The invention described and claimed in this application is an improvement on that described and claimed in an application for Letters Patent of the United States filed by me March 1, 1906, Serial No. 303,578, and in the practice of my invention as shown, described, and claimed herein, I provide a pan $a$, having yoke-shaped supports $b$ pivoted or hinged transversely of the bottom end portions thereof, as shown at $b^2$, and said supports may be raised to an upright position, as shown in full lines in Figs. 1, 2, and 3, or lowered into a horizontal position and rested on the bottom of the pan, as indicated in dotted lines in Fig. 2. I also provide an open-work receptacle $c$, composed of metal, and which may consist of perforated sheet metal, wire gauze, or any other suitable material; but I prefer sheet metal having large holes or openings $c^2$ in the sides and ends thereof, and said receptacle is composed of two similar parts hinged together at $c^3$, and any suitable means may be provided for holding the separate parts of the receptacle together, such as clamps, catches, or other devices opposite the hinges $c^3$.

The receptacle $c$ is provided longitudinally of two or more of its sides in the form of construction shown with scoops or dippers $d$, which are secured thereto in any desired manner, preferably by means of tongues $d^2$ passed inwardly through the material of the receptacle, and these scoops or dippers $d$ are open at one side, and the outer closed side thereof is preferably curved, and said scoops or dippers are of such dimensions that when the receptacle $c$ is turned on the supports $b$ the contents of the pan $a$ will be scooped up and dumped onto the receptacle and through the openings or perforations therein onto the meat contained therein, and in this way the meat will be automatically basted, as will be readily understood.

In practice the meat to be roasted is placed in the receptacle $c$, and said receptacle is closed and the supports $b$ are raised into an upright position and the receptacle $c$ placed thereon, and when so mounted said receptacle may be rotated within the pan $a$, and this may be done by means of a fork, spoon, or other device inserted through the door of the oven of a stove or range in which the said roasting device is placed.

The receptacle $c$ is provided at its opposite ends with headed pins $e$, and the supports $b$ are provided in the top thereof with downwardly-directed loop members or recesses $b^3$, adapted to receive said headed pins, and the supports $b$ are also provided at the bottom thereof with feet $b^4$, and in this way the receptacle $c$ holds the supports in an upright position, and the said receptacle may be turned or rotated as hereinbefore described.

In the operation of roasting meat in a device of this kind the juices or other liquids fall into the pan $a$, and in the rotation of the receptacle the said juices or liquids are scooped up and dumped onto the receptacle and onto the meat therein by the dippers or scoops $d$, and in this way the said meat is automatically basted, and by means of my improvement it will be apparent that the meat may be thoroughly and equally roasted on all sides thereof and in much less time than is possible with devices of this class as usually constructed.

The receptacle $c$, as will be seen, is simply an open-work casing or receiver composed of two parts hinged together at one side and provided at the opposite side with means for securing them together when the meat to be roasted is placed therein, and said receiver has no interior obstructions of any kind and may be entirely filled with meat, if desired.

Having fully described my invention, what I claim as new, and desire to secure by Letters Patent, is—

1. A meat-roasting device adapted to be placed in an oven, said device comprising a pan having supports pivoted or hinged to the bottom thereof near the opposite ends thereof and adapted to be folded flat on the bottom of the pan and to be raised into an upright position, an open-work receptacle adapted to be rotatably mounted on said supports when the latter are in an upright position, said supports being also provided at their pivoted or hinged points with means whereby they are held in said upright position when the receptacle is placed thereon.

2. A meat-roasting device adapted to be placed in an oven, said device comprising a pan having supports pivoted or hinged to the bottom thereof near the opposite ends thereof and adapted to be folded flat on the bottom of the pan and to be raised into an upright position, an open-work receptacle adapted to be rotatably mounted on said supports when the latter are in an upright position, said supports being also provided at their pivoted or hinged points with means whereby they are held in said upright position when the receptacle is placed thereon, said receptacle being divided longitudinally into two parts hinged together at one side.

3. A meat-roasting device adapted to be placed in an oven, said device comprising a pan having yoke-shaped supports the sides of which are pivoted or hinged to the bottom of the pan near the opposite ends thereof, said supports being adapted to be folded on the bottom of the pan and to be raised into an upright position, an open-work receptacle adapted to be rotatably mounted on said supports when the latter are in an upright position, said supports being also provided at their pivoted or hinged points with laterally-directed feet whereby when the receptacle is mounted thereon they will be held in an upright position by said receptacle and said feet, said receptacle being divided longitudinally into two parts hinged together at one side, and the opposite side portions thereof being provided with longitudinally-arranged dippers or scoops.

4. A meat-roasting device adapted to be placed in an oven, said device comprising a pan having supports pivoted or hinged to the bottom thereof near the opposite ends thereof and adapted to be folded flat on the bottom of the pan and to be raised into an upright position, an open-work receptacle adapted to be rotatably mounted on said supports when the latter are in an upright position, said supports being also provided at their pivoted or hinged points with means whereby they are held in said upright position when the receptacle is placed thereon, said receptacle being divided longitudinally into two parts hinged together at one side, and being also provided at its sides with longitudinally-arranged dippers or scoops.

In testimony that I claim the foregoing as my invention I have signed my name, in presence of the subscribing witnesses, this 3d day of May, 1906.

CHARLES MANNHEIM.

Witnesses:
F. A. STEWART,
C. E. MULREANY.